(12) United States Patent
Jung et al.

(10) Patent No.: US 8,351,852 B2
(45) Date of Patent: Jan. 8, 2013

(54) METHOD FOR TRANSMITTING OBJECT BETWEEN DEVICES HAVING MULTI-RADIO INTERFACE

(75) Inventors: Hee-Won Jung, Gyeonggi-do (KR);
Jun-Ho Koh, Gyeonggi-do (KR);
Sang-Mook Lee, Gyeonggi-do (KE);
Gi-Sang Lee, Gyeonggi-do (KR);
Sergey Zhidkov, Izhevsk (RU)

(73) Assignee: Samsung Electronics Co., Ltd (KR)

( * ) Notice: Subject to any disclaimer, the term of this patent is extended or adjusted under 35 U.S.C. 154(b) by 216 days.

(21) Appl. No.: 12/965,323

(22) Filed: Dec. 10, 2010

(65) Prior Publication Data

US 2011/0143677 A1 Jun. 16, 2011

Related U.S. Application Data

(60) Provisional application No. 61/285,363, filed on Dec. 10, 2009.

(30) Foreign Application Priority Data

Nov. 25, 2010 (KR) .................. 10-2010-0118065

(51) Int. Cl.
*H04B 7/24* (2006.01)
(52) U.S. Cl. ........... 455/39; 455/67.11; 455/450; 381/1; 381/2
(58) Field of Classification Search .............. 455/39, 455/67.11, 450, 452.2, 455; 381/1, 2, 10
See application file for complete search history.

(56) References Cited

U.S. PATENT DOCUMENTS

| 7,941,480 B2 * | 5/2011 | Atsmon et al. ............. 709/202 |
| 2006/0020467 A1 * | 1/2006 | Iwaki et al. ................. 704/258 |
| 2010/0110837 A1 | 5/2010 | Jung et al. |
| 2010/0290484 A1 | 11/2010 | Jung et al. |

FOREIGN PATENT DOCUMENTS

| JP | 2001-148670 | 5/2001 |
| JP | 2010-139270 | 6/2010 |
| KR | 1020100048885 | 5/2010 |
| KR | 1020100127174 | 12/2010 |

* cited by examiner

*Primary Examiner* — Tuan H Nguyen
(74) *Attorney, Agent, or Firm* — The Farrell Law Firm, P.C.

(57) ABSTRACT

A method for transmitting, by a mobile device, a data object, is provided, and includes estimating expected transmission times required for transmitting an object between devices by an acoustic communication link and supported radio interfaces, based on a size of the object, transmitting the object through an acoustic communication channel when the link is estimated to provide a shortest expected transmission time, and determining rankings of the radio interfaces according to the expected transmission times when the acoustic communication link does not provide a shortest expected transmission time, transmitting rankings information and configuration information on the supported radio interfaces through the acoustic communication channel by a configuration container, and transmitting the object through a radio interface through which a response is received.

17 Claims, 4 Drawing Sheets

METHOD FOR TRANSMITTING OBJECT BETWEEN DEVICES HAVING MULTI-RADIO INTERFACE

PRIORITY

This application claims priority under 35 U.S.C. 119 to a provisional application entitled "Method for Transmitting Object between Devices Having Multi-Radio Interface" filed in the United States Patent and Trademark Office on Dec. 10, 2009 and assigned Ser. No. 61/285,363, and an application filed in the Korean Intellectual Property Office on Nov. 25, 2010 and assigned Serial No. 10-2010-0118065, the contents of both of which are incorporated herein by reference.

BACKGROUND OF THE INVENTION

1. Field of the Invention

The present invention relates generally to data encoding and transmitting technology which can be utilized in a wireless communication system and mobile devices, and more particularly, to a method for transmitting an object between devices having a multi-radio interface.

2. Description of the Related Art

Modern mobile devices, such as a mobile phone, a netbook, and an Internet tablet, include a plurality of radio interfaces for wirelessly transmitting data, such as cellular radio, Wi-Fi, Wi-Max, Bluetooth®, Zigbee®, and wireless Universal Serial Bus (USB).

There is a constant increase in the amount of information stored, such as access information, calendar/daily schedule information, favorite link information, a play list, music, images and video files, and the number of radio interfaces allowing the users to share such information between mobile devices also increases.

However, partial interfaces require a complex setup procedure, which can be confusing to the users. Generally, in order to implement a direct device connection to a more improved radio interface, such a setup procedure requires the user to perform manual setup processes, such as a device selection from a list, an input of a network Identifier (ID), an input of a Personal Identification Number (PIN) code, and an input of other configuration information. Moreover, various radio interfaces in recent mobile devices have duplicate functionalities, and general users do not pay attention to a scheme of selecting an interface suitable for a specific content or application.

Also, some devices cannot provide all interfaces due to limitations in size and/or cost. Furthermore, since a previously used radio interface can rapidly become obsolete, a new device commercialized with the rapid development of technology may not support the previous radio interface.

SUMMARY OF THE INVENTION

Accordingly, the present invention has been made to solve the above-mentioned problems occurring in the prior art, and the present invention provides a mobile device for supporting a multi-radio interface, which has a simple and efficient solution in delivering data files between devices, and a method for transmitting a data object between the devices.

The method enables the user to avoid confusion in use, and makes it possible to reduce a waste of time in selecting and configuring a radio interface suitable for a data file transmission.

To this end, the present invention discloses that an acoustic signal is used as a means for initializing and controlling a data transmission. The use of an acoustic signal is creased based on the fact that audio playback and capture devices (i.e. speaker and microphone) have been necessarily equipped in most of recent mobile Internet terminals and mobile phones. Moreover, since an acoustic signal is a basic medium in human interaction and is a natural scheme, such elements (speaker and microphone) should not fall into disuse even with the development of new technology. In contrast, some of the most advanced radio interfaces, such as Bluetooth and Wi-Fi, may not be as popular in the future, or may be removed or replaced by an interface, which is more improved but is not compatible.

In such terms, the method disclosed by the present invention is future-proof, so that it is possible to support communication between devices in which previous/new radio interfaces are mixed.

In accordance with an aspect of the present invention, there is provided a method for transmitting, by a mobile device, a data object, the method including estimating expected transmission times required for transmitting an object between devices by means of an acoustic communication link and supported radio interfaces, based on a size of the object, transmitting the object through an acoustic communication channel when the acoustic communication link provides a shortest expected transmission time as a result of the estimation, and determining rankings of the radio interfaces according to the expected transmission times when the acoustic communication link does not provide a shortest expected transmission time as a result of the estimation, transmitting information on the rankings and configuration information on the respective supported radio interfaces through the acoustic communication channel by means of a configuration container having a preset format, and transmitting the object through a radio interface through which a response is received.

In accordance with another aspect of the present invention, there is provided a method for receiving, by a mobile device, a data object, the method including waiting for an acoustic communication signal, when the acoustic communication signal is received and the received acoustic communication signal corresponds to an object transmission through an acoustic communication channel from a transmission device, receiving the object through the acoustic communication channel, and when the acoustic communication signal is received and the received acoustic communication signal does not correspond to an object transmission through the acoustic communication channel from a transmission device, transmitting a response message through a radio interface according to ranking information on radio interfaces which has been transmitted through an acoustic communication link from the transmission device, and receiving an object transmitted through the corresponding radio interface from the transmission device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Figure 1:
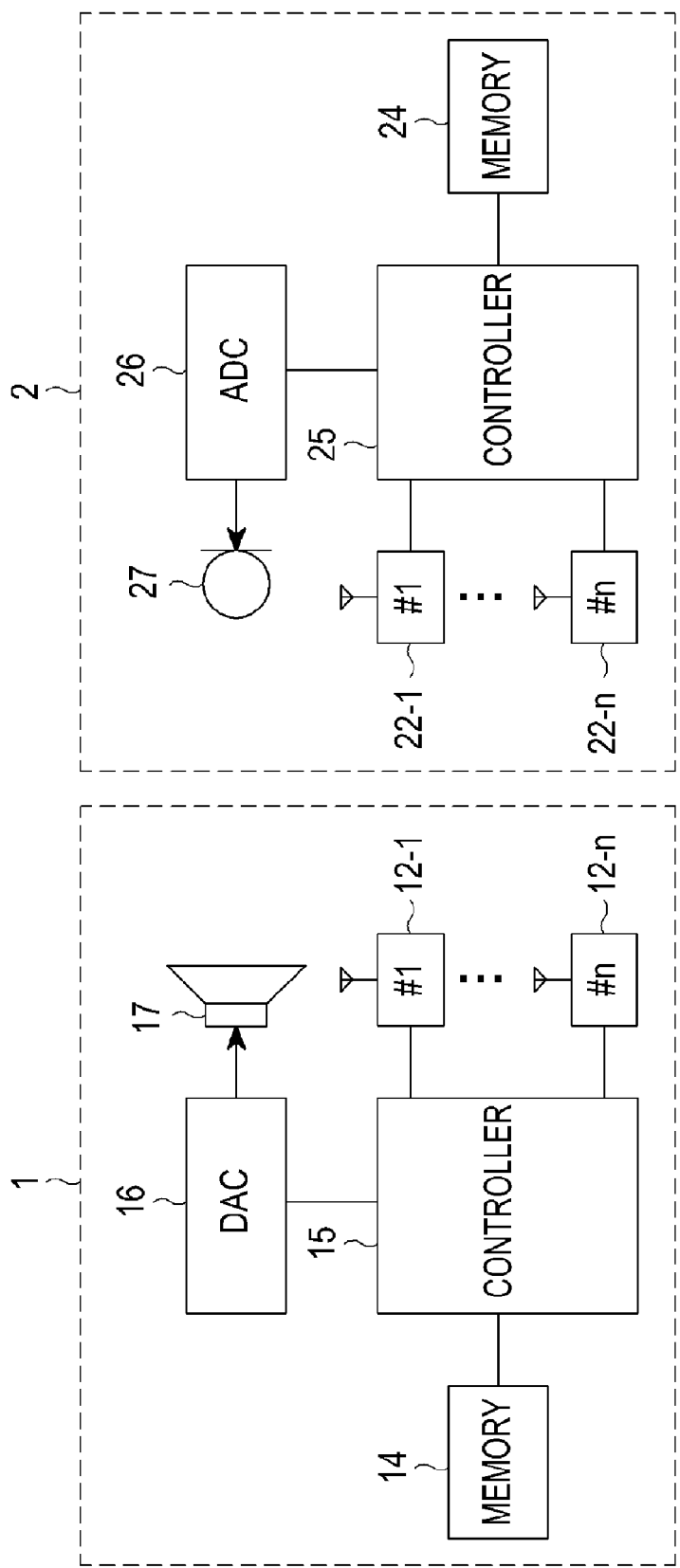
FIG. 1 schematically illustrates the configuration of a mobile device having a multi-radio interface, to which the present invention is applied.

Embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 schematically illustrates the configuration of a mobile device having a multi-radio interface, to which the present invention is applied. First, the physical configuration of devices, to which the present invention is applied, will be described with reference to FIG. 1. FIG. 1 illustrates a case where a transmission device 1 has a configuration for outputting an acoustic signal through a speaker 17, and a reception device 2 has a configuration for receiving an acoustic signal through a microphone 27. However, in real environments, the transmission device 1 and the reception device 2 may have the same hardware components, i.e. both speaker and microphone.

The transmission device 1 includes a plurality of radio interfaces 12-1, . . . , 12-n, such as cellular radio, Wi-Fi, Wi-Max, Bluetooth®, Zigbee®, and wireless USB, and has a function of communicating with the reception device 2 through an appropriate one of the radio interfaces. In addition, the transmission device 1 includes a speaker 17 connected with a digital-to-analog converter (DAC) 16 in order to output an acoustic signal, and includes a controller 15 for generally controlling an output of information through an acoustic signal and transmission of information through the plurality of radio interfaces 12-1, . . . , 12-n and performing an appropriate data encoding operation. The transmission device 1 further includes a memory 14 for storing an operating program for the controller 15 according to an embodiment of the present invention, and storing information required for the operation of the controller 15.

Similarly to the transmission device 1, the reception device 2 includes a plurality of radio interfaces 22-1, . . . , 22-n, and has a function of communicating with the transmission device 1 through an appropriate one of the radio interfaces. In addition, the reception device 2 includes a microphone 27 for receiving and providing an acoustic signal to an analog-to-digital converter (ADC) 26, and includes a controller 25 for generally controlling reception of information through an acoustic signal and reception of information through the plurality of radio interfaces 22-1, . . . , 22-n and performing an appropriate data decoding operation. The reception device 2 further includes a memory 24 for storing an operating program for the controller 25, and storing information required for the operation of the controller 25.

In addition, each of the transmission device 1 and reception device 2 includes a power supply element (not shown) for supplying power to all the functional units of the corresponding device, and may additionally include a key input unit (not shown) for receiving an input according to an operation control by the user, and a display unit (not shown) for displaying an operation state and result.

A device to which the present invention is applied can be configured as shown in FIG. 1, and a method according to the present invention can be implemented by software for cellular phones, portable multimedia players, or computing devices. The transmission device and reception device according to the present invention can be implemented with any mobile device that satisfies the following conditions: for example, each device has at least one radio interface, at least the transmission device (i.e. a device transmitting a file at the beginning stage) has a speaker while the reception device has a microphone, and the transmission and reception devices have sufficient Central Processing Unit (CPU) resources to execute software for encoding and decoding, respectively, acoustic communication signals. Hereinafter, the characteristics and operations of a mobile device having the aforementioned configuration according to an embodiment of the present invention will be described in detail.

First, as described above, an acoustic signal is used as an initialization and control means for data transmission. Such a conception of acoustic communication is well known in the art. Some typical types of acoustic communication include dual-tone multi-frequency (DTMF) signaling or other simple signaling methods. In recent systems, enhanced coding, modulation, and adaptive protocols may be utilized to deliver robust performance on a noisy acoustical link. An example of such a system is disclosed in Korean Patent Application No. 2010-32589 (Title: Encoder, Decoder, Encoding and Decoding Method, Application Date: Apr. 9, 2010), which is commonly owned by the assignee of the present invention. Such a recent acoustic communication system can achieve a data bit rate of 30 kbit/s in good channel environments, and can achieve a data bit rate of approximately 6 to 10 kbit/s in noisy environments and normal channel environments.

Although such data bit rates seem to be slow as compared with a transfer rate of several megabits per second which has been achieved in recent radio interfaces, it may be preferred to use acoustic communication when transmitting/receiving a small object (e.g. small file), since the setup time required in such a communication system is very short. Such an idea will be described in detail by example hereinafter. Also, an acoustic data signal can be used to initialize and set up a radio connection, as disclosed in Korean Patent Application No. 2009-98900 (Title: Wireless Communication Method and Apparatus using Acoustic Signal, Application Date: Oct. 16, 2009), which is commonly owned by the assignee of the present invention.

In order to estimate a user's actual waiting time required for delivering (i.e. transferring) a data file from one device to another device, a setup time necessary for forming a communication link in a communication system must be considered. In this case, when transmission/reception devices are in a power-off state, a time period required for powering up the transmission/reception devices must be included. For example, in the device disclosed in Korean Patent Application No. 2010-32589, a time period required for transmitting an object in a uni-directional acoustic communication system is calculated as shown in Equation (1) below.

$$t_{ac} = t_{ac}^{(setup)} + \frac{S}{R_{ac}} \quad (1)$$

In Equation (1), $t_{ac}^{(setup)}$ represents a communication link setup time (e.g. a time period including a synchronization time and a signal delay time, which is caused in an audio buffer and typically is approximately 1 to 2 seconds, in the case of an acoustic communication system), "S" represents the size (i.e. the number of bits) of a transmitted object, and $R_{ac}$ represents a typical data rate (i.e. the number of bits per second) of the acoustic communication system.

In the case of a radio communication interface, such as Bluetooth® or Wi-Fi, the setup time may be significantly lengthened or may vary, due to the adoption of user interfaces, such as selecting a device from a list of generally recognized devices, inputting a network ID, inputting an Internet Protocol (IP) address, and inputting a number key. However, according to an embodiment of the present invention, it is considered that a radio link can be automatically formed through the use of a method of transmitting information on an acoustic communication link at the beginning stage, as disclosed in Korean Patent Application No. 2009-98900. In this case, a radio communication link setup time includes a time period required for transmitting system configuration information (which generally has a size of several tens of bytes) through an acoustic communication link, and a time period required by a radio handshaking protocol.

Therefore, a total time period required for delivering (i.e. transferring) an object through a first radio interface #1 may be expressed as Equation (2) below.

$$t_1 = t_{ac}^{(setup)} + \frac{S_{cfg}}{R_{ac}} + t_1^{(setup)} + \frac{S}{R_1} \qquad (2)$$

In Equation (2), $S_{cfg}$ represents the size of a system configuration container transmitted through an acoustic communication link, $t_1^{(setup)}$ represents a time period typically required for setting up a first radio link #1 after all required configuration information is received, and $R_1$ represents a typical data transfer rate (i.e. the number of bits per second) on the first radio interface #1.

Similarly, a total time period required for delivering (i.e. transferring) an object through a second radio interface #2 may be expressed as Equation (3) below.

$$t_2 = t_{ac}^{(setup)} + \frac{S_{cfg}}{R_{ac}} + t_2^{(setup)} + \frac{S}{R_2} \qquad (3)$$

Similarly, even with respect to still another radio interface included in the corresponding device, a total time period required for delivering an object may be calculated.

Although it may seem that the fastest available radio interface is always selected in order to transmit a file, this is not always so in actuality. Specifically, a relatively faster interface requires a longer link setup time, which may remove the advantages of a fast bit rate when a small or middle sized object is transmitted.

For example, assume that the system supports two radio interfaces which have parameters, as described below.

Figure 2:
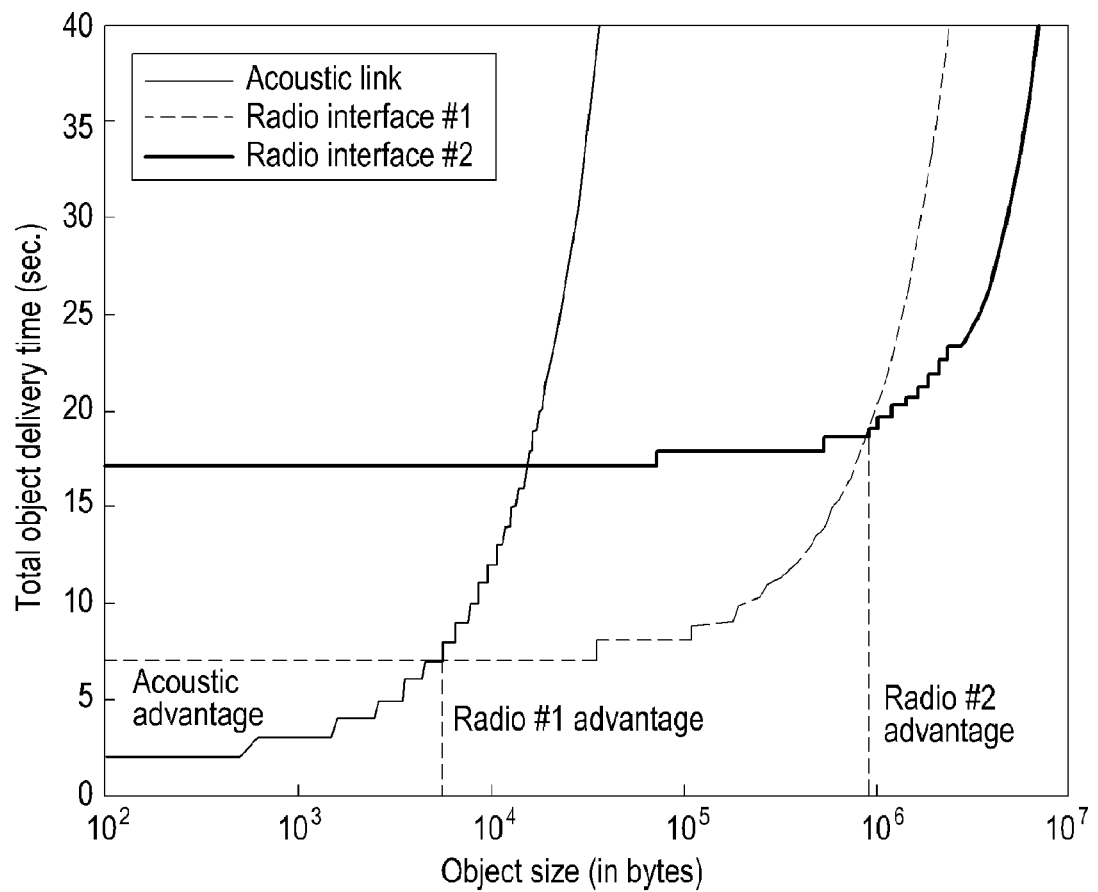
FIG. 2 illustrates "an object transfer time as a function of an object size" with respect to an acoustic communication link and two radio interfaces, which are taken into consideration according to an embodiment of the present invention.

First Radio Interface #1
$R_1$=600000 bit/s
$t_1^{(setup)}$=5 sec
Second Radio Interface #2
$R_2$=3000000 bit/s
$t_2^{(setup)}$=15 sec
In addition, an acoustic communication system having parameters, as described below, may be used.
$t_{ac}^{(setup)}$=1.5 sec
$R_{ac}$=8000 bit/s
Configuration Container's Size: $S_{cfg}$=400 bit FIG. 2 illustrates a relationship between an object delivery time and an object size with respect to the aforementioned example (i.e. acoustic communication link, first radio interface #1, and second radio interface #2). Referring to FIG. 2, it can be understood that, when a file has a size smaller than approximately 900 kbytes, the second radio interface #2 which is the fastest is not the best selection. When the size of a file is larger than 5 kbytes and smaller than 900 kbytes, using the first radio interface #1 can achieve the best result (i.e. the shortest delivery time). Also, when the size of a file (i.e. object) is smaller than 5 kbytes, it is preferred to directly transmit the file through an acoustic communication channel because the acoustic communication channel has the shortest link setup time.

The operating method according to an embodiment of the present invention is as follows. First, a transmission device takes size information of an object (file), and estimates object transmission time periods through an acoustic communication link and the respective supported radio interfaces, respectively, based on the size information of the corresponding object. The estimation may be calculated by Equations (1) to (3), or by similar equations. When a result of the calculation shows that the shortest delivery time can be achieved through the acoustic communication link, the file is encoded and modulated directly into an acoustic communication signal.

Meanwhile, when a result of the calculation shows that at least one radio interface can deliver the object faster than the acoustic communication link, the transmission device prepares a configuration container for all available radio interfaces and rankings of radio interfaces according to expected object delivery time periods. In this case, a radio interface expected to provide the shortest object delivery time is allocated the highest ranking. Thereafter, such a configuration container is encoded into an acoustic communication signal, and is then output through a speaker of the transmission device.

Meanwhile, when a reception device has received an acoustic communication signal output from the transmission device, the reception device receives an acoustic signal and decoding a configuration container, selects a highest-ranking radio interface among radio interfaces currently and physically included in the reception device, and sends a response message through the selected radio interface, thereby forming a radio communication link.

Once the transmission device obtains a valid feedback signal through one of available radio interfaces, the transmission device sends a data object (e.g. file) through the corresponding radio interface, without delay. In this case, it should be noted that a radio interface for file transmission is actually selected by a reception device. A transmission device provides only a recommendation (i.e. a ranking list).

In some cases, a simple fallback scheme is used when a reception device may not support any one among radio interfaces recommended by a transmission device. Specifically, when a reception device cannot support any one among radio interfaces recommended by a transmission device, the reception device does not send a response message. Accordingly, when the transmission device does not receive a valid response even through any one of its own radio interfaces for a time period, the transmission device stops transmitting configuration information, encodes the original file into an acoustic communication signal, and sends the file directly to an acoustic communication link. Although such a scheme requires a long transmission time period, the scheme ensures at least that a corresponding object is fully delivered.

Figure 3:
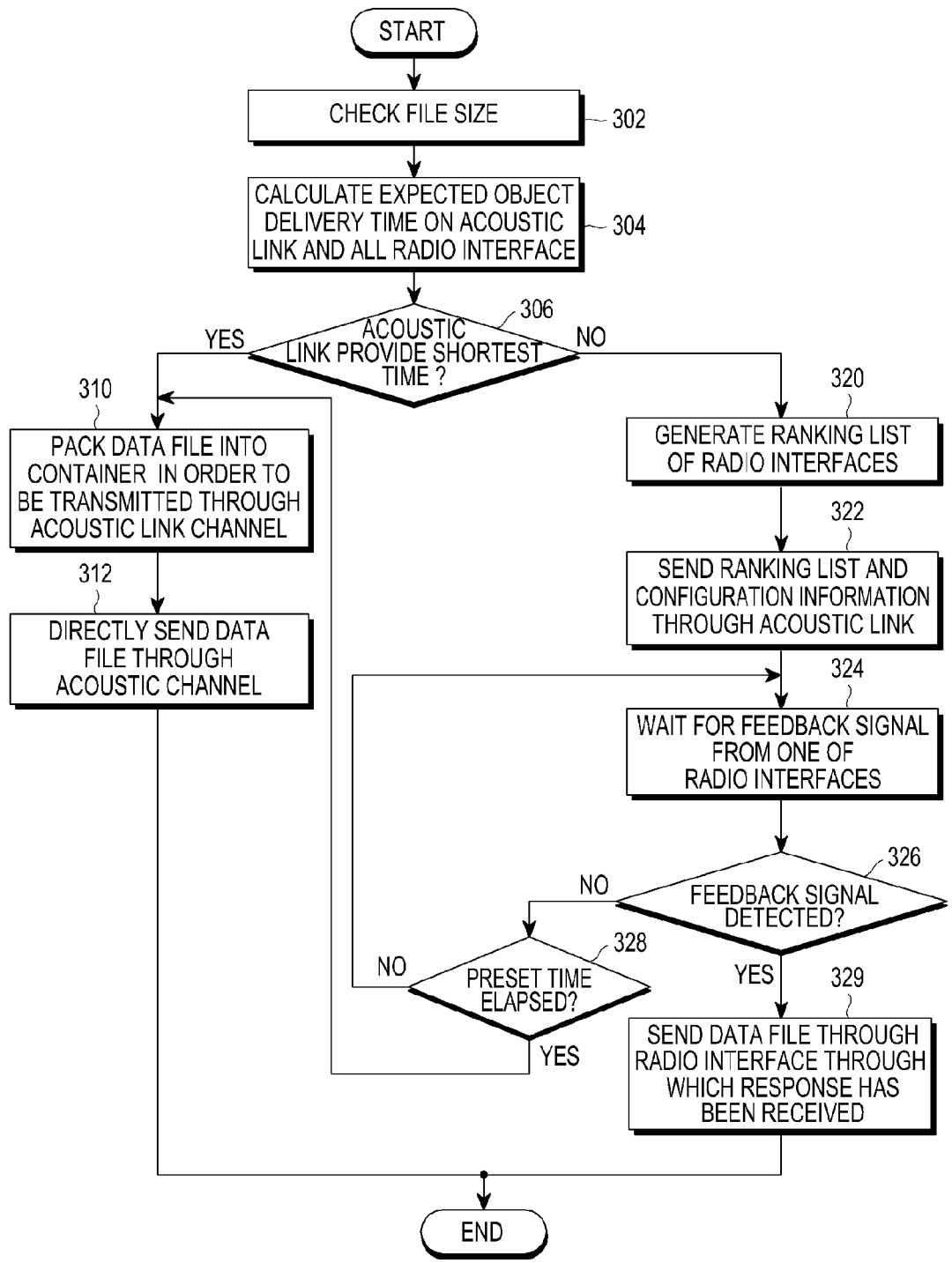
FIG. 3 illustrates an object delivery operation according to an embodiment of the present invention.

FIG. 3 illustrates an object delivery operation according to an embodiment of the present invention. Referring to FIG. 3, a transmission device checks the size of a data file to be transmitted in step 302. The transmission device calculates object delivery times expected with respect to an acoustic communication link and all radio interfaces in step 304. Next, it is determined whether the acoustic communication link requires the shortest delivery time based on a result of the calculation in step 306. If the acoustic communication link requires the shortest delivery time in step 306, the transmission device proceeds to step 310, and if not, the transmission device proceeds to step 320.

In step 310, the transmission device packs the data file in a container to transmit the data file through an acoustic communication channel. Thereafter, the transmission device directly sends the data file through the acoustic communication channel in step 312.

Meanwhile, in step 320, the transmission device generates a ranking list of radio interfaces. Next, in step 322, the transmission device sends the ranking list and configuration information on all the radio interfaces through the acoustic communication link by means of a configuration container having a preset format. Thereafter, the transmission device waits for a feedback signal from any one among the radio interfaces in step 324. The transmission device determines whether a feedback signal is detected in step 326. When it is determined that a feedback signal is not detected, the transmission device proceeds to step 328. In contrast, when it is determined that a feedback signal is detected, the transmission device proceeds to step 329, where the transmission device sends the data file through a corresponding radio interface, through which the feedback signal has been detected.

In step 328, the transmission device determines whether a waiting duration time has elapsed, and returns to step 324 so as to repeat the aforementioned procedure when the present waiting duration time has not elapsed. In contrast, when the present waiting duration time has elapsed, the transmission device proceeds to step 310, where the transmission device performs an operation for transmitting the data file through the acoustic communication channel.

Figure 4:
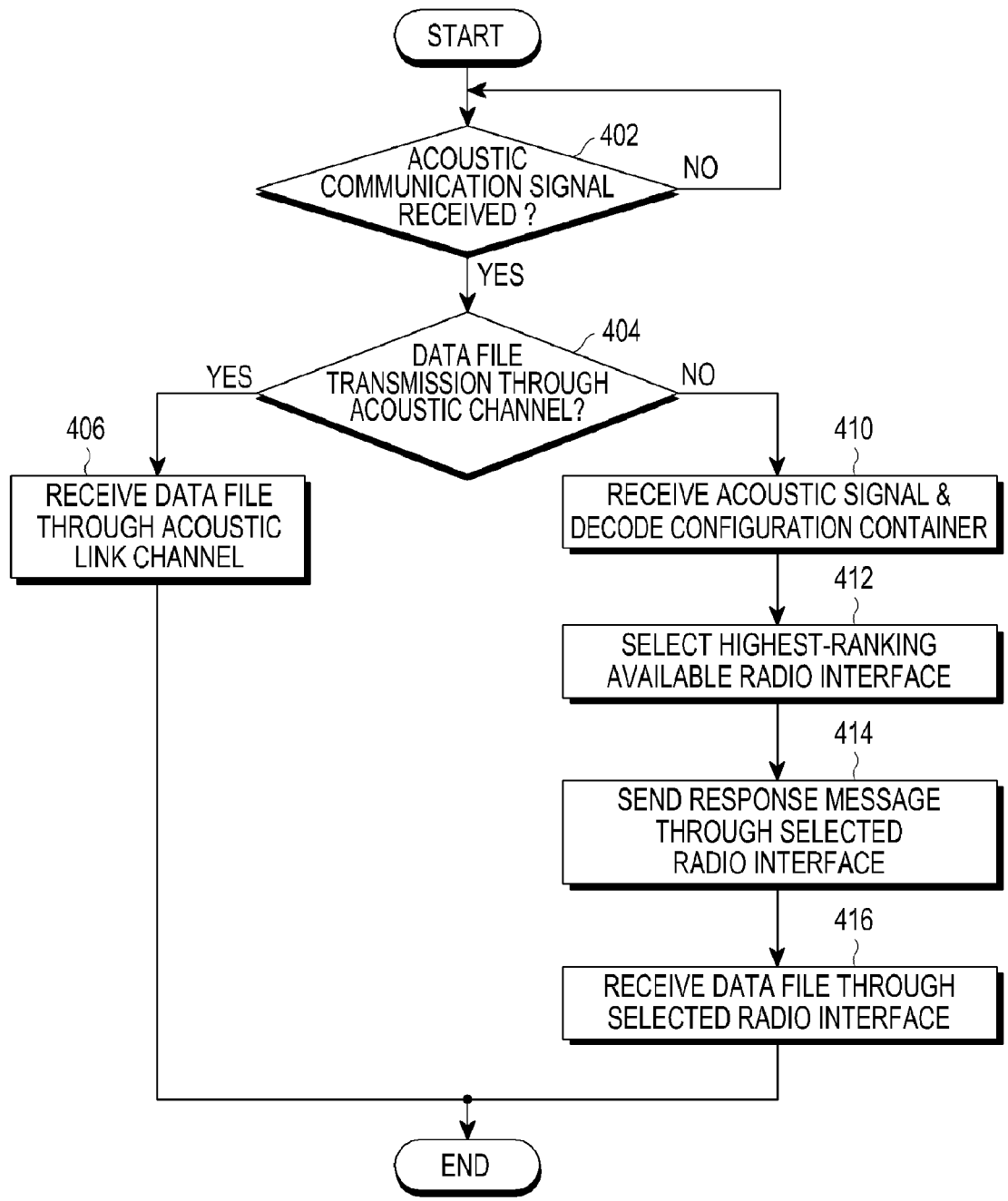
FIG. 4 illustrates an object reception operation according to an embodiment of the present invention.

FIG. 4 illustrates an object reception operation according to an embodiment of the present invention. Referring to FIG. 4, a reception device determines whether an acoustic communication signal is received in step 402, and proceeds to step 404 when an acoustic communication signal is received. In step 404, the reception device determines whether the received acoustic communication signal corresponds to a data file transmission through an acoustic communication channel from a transmission device. If the received acoustic communication signal corresponds to a data file transmission through an acoustic communication channel from the transmission device, the reception device proceeds to step 406, where the reception device receives a data file through the acoustic communication channel, and if not, the reception device proceeds to step 410.

In step 410, the reception device receives the acoustic signal, and decodes a configuration container. In step 412, the reception device selects a highest-ranking available radio interface by referring to a ranking list included in the decoded configuration container. Then, in step 414, the reception device sends a response message through the selected radio interface, and in step 416, the reception device receives a data file transmitted through the selected radio interface from the transmission device.

An operation for delivering an object between devices having a multi-radio interface according to an embodiment of the present invention can be performed as described above. While the invention has been shown and described with reference to certain embodiments thereof, it will be understood by those skilled in the art that various changes in form and details may be made therein without departing from the spirit and scope of the invention as defined by the appended claims.

Particularly, while the above description has been given based on a transmission device sending ranking information of radio interfaces to a reception device, and the reception device analyzing the ranking information and selecting a highest-ranking radio interface among radio interfaces included in the reception device, another embodiment of the present invention may be applied when transmission and reception devices have the same hardware configuration. In this case, the transmission device selects a highest-ranking radio interface and sends information on the selected radio interface to the reception device, so that the reception device can communicate with the transmission device through the selected radio interface because the reception device has the same radio interfaces as those of the transmission device.

As described above, according to the present invention, it is possible to provide a method for simply and efficiently delivering data files between mobile devices which support a multi-radio interface. Simplicity for the user is optimized, and time is saved by preventing selection and configuration of a radio interface suitable for a data file transmission.

What is claimed is:

1. A method for transmitting, by a mobile device, a data object, the method comprising the steps of:
   estimating expected transmission times required for transmitting an object between devices by means of an acoustic communication link and supported radio interfaces, based on a size of the object;
   transmitting the object through an acoustic communication channel when the acoustic communication link provides a shortest expected transmission time as a result of the estimation; and
   determining rankings of the radio interfaces according to the expected transmission times when the acoustic communication link does not provide a shortest expected transmission time as a result of the estimation, transmitting information on the rankings and configuration information on the respective supported radio interfaces through the acoustic communication channel by means of a configuration container having a preset format, and transmitting the object through a radio interface through which a response is received.

2. The method as claimed in claim 1, wherein, after the ranking information and the configuration information is transmitted through the acoustic communication channel, the object is transmitted through the acoustic communication channel when there is no response through every radio interface or when a response is not detected for a time period.

3. The method as claimed in claim 1, wherein each expected transmission time comprises a link setup time.

4. The method as claimed in claim 1, wherein the ranking information corresponds to a ranking list of the radio interfaces.

5. The method as claimed in claim 1, wherein the ranking information corresponds to selection information on a highest-ranking radio interface among the radio interfaces.

6. The method as claimed in claim 1, wherein the expected transmission time on the acoustic communication link is determined by:

$$t_{ac} = t_{ac}^{(setup)} + \frac{S}{R_{ac}},$$

and the expected transmission time on each radio interface is determined by:

$$t_1 = t_{ac}^{(setup)} + \frac{S_{cfg}}{R_{ac}} + t_1^{(setup)} + \frac{S}{R_1},$$

wherein $t_{ac}^{(setup)}$ represents a time period required for setting up the acoustic communication link, S represents a size of the object to be transmitted, $R_{ac}$ represents a data rate of the acoustic communication link, $S_{cfg}$ represents a size of a system configuration container transmitted through the acoustic communication link, $t_1^{(setup)}$ represents a time period required for setting up the corresponding radio interface after configuration information is received, and $R_1$ represents a data transfer rate on the corresponding radio interface.

7. A method for receiving, by a mobile device, a data object, the method comprising the steps of waiting for an acoustic communication signal;

receiving an object through an acoustic communication channel, when the acoustic communication signal is received and corresponds to the object transmission through the acoustic communication channel from a transmission device; and transmitting a response message through a radio interface according to ranking information on radio interfaces, which ranking information has been transmitted through an acoustic communication link from the transmission device, when the acoustic communication signal is received and does not correspond to an object transmitted through the acoustic communication channel from a transmission device, and receiving an object transmitted through the corresponding radio interface from the transmission device.

8. The method as claimed in claim 7, wherein the mobile device does not transmit the response message when the mobile device does not include any radio interface according to the ranking information.

9. The method as claimed in claim 7, wherein the ranking information corresponds to a ranking list of the radio interfaces.

10. The method as claimed in claim 7, wherein the ranking information corresponds to selection information on a highest-ranking radio interface among the radio interfaces.

11. A method for transmitting and receiving a data object between mobile devices, the method comprising the steps of estimating, by a transmission side, expected transmission times required for transmitting an object between devices by means of an acoustic communication link and supported radio interfaces, based on a size of the object;

transmitting, by a transmission side, the object through an acoustic communication channel when the acoustic communication link provides a shortest expected transmission time as a result of the estimation;

determining, by a transmission side, rankings of the radio interfaces according to the expected transmission times when the acoustic communication link does not provide a shortest expected transmission time as a result of the estimation, transmitting information on the rankings and configuration information on the respective supported radio interfaces through the acoustic communication channel by means of a configuration container having a preset format, and transmitting the object through a radio interface through which a response is received;

waiting, by a reception side, for an acoustic communication signal;

receiving, by a reception side, the object through the acoustic communication channel, when the acoustic communication signal is received and corresponds to an object transmission through the acoustic communication channel from a transmission device; and transmitting, by a reception side, a response message through a radio interface according to ranking information on radio interfaces, which ranking information has been transmitted through the acoustic communication link from a transmission device when the acoustic communication signal is received and the received acoustic communication signal does not correspond to an object transmission through the acoustic communication channel from the transmission device, and receiving an object transmitted through the corresponding radio interface from the transmission device.

12. The method as claimed in claim 11, wherein, after transmitting the ranking information and the configuration information through the acoustic communication channel, the transmission side transmits the object through the acoustic communication channel when there is no response through every radio interface or when a response is not detected for a time period.

13. The method as claimed in claim 11, wherein the reception side does not transmit the response message when the mobile device does not include any radio interface according to the ranking information.

14. The method as claimed in claim 11, wherein each expected transmission time comprises a link setup time.

15. The method as claimed in claim 11, wherein the ranking information corresponds to a ranking list of the radio interfaces.

16. The method as claimed in claim 11, wherein the ranking information corresponds to selection information on a highest-ranking radio interface among the radio interfaces.

17. The method as claimed in claim 11, wherein the expected transmission time on the acoustic communication link is determined by:

$$t_{ac} = t_{ac}^{(setup)} + \frac{S}{R_{ac}},$$

and the expected transmission time on each radio interface is determined by:

$$t_1 = t_{ac}^{(setup)} + \frac{S_{cfg}}{R_{ac}} + t_1^{(setup)} + \frac{S}{R_1},$$

wherein $t_{ac}^{(setup)}$ represents a time period required for setting up the acoustic communication link, S represents a size of the object to be transmitted, $R_{ac}$ represents a data rate of the acoustic communication link, $S_{cfg}$ represents a size of a system configuration container transmitted through the acoustic communication link, $t_1^{(setup)}$ represents a time period required for setting up the corresponding radio interface after configuration information is received, and $R_1$ represents a data transfer rate on the corresponding radio interface.

* * * * *

UNITED STATES PATENT AND TRADEMARK OFFICE
CERTIFICATE OF CORRECTION

PATENT NO. : 8,351,852 B2  Page 1 of 1
APPLICATION NO. : 12/965323
DATED : January 8, 2013
INVENTOR(S) : Hee-Won Jung et al.

It is certified that error appears in the above-identified patent and that said Letters Patent is hereby corrected as shown below:

On the Title Page,

Item (75) Inventors:

"Sang-Mook Lee, Gyeonggi-do (KE)" should be -- Sang-Mook Lee, Gyeonggi (KR) --

Signed and Sealed this
Eleventh Day of March, 2014

Michelle K. Lee
*Deputy Director of the United States Patent and Trademark Office*